May 4, 1965 R. L. COLETTI 3,181,551
FLOW DIVIDING VALVE
Filed Feb. 15, 1963 2 Sheets-Sheet 1

INVENTOR.
RUDOLPH L. COLETTI
BY
Cushman, Darby & Cushman
ATTORNEYS

_United States Patent Office_

3,181,551
Patented May 4, 1965

3,181,551
FLOW DIVIDING VALVE
Rudolph L. Coletti, 246 5th Ave., Troy, N.Y.
Filed Feb. 15, 1963, Ser. No. 258,784
6 Claims. (Cl. 137—119)

This invention relates to valves and more particularly to a valve for dividing a fluid among a plurality of orifices according to a predetermined pattern.

The valve of the invention is particularly applicable to incorporation within a lawn sprinkler although it is within the purview of the invention and a primary object to provide a valve having general application as a flow divider to proportionate a fluid stream among several conduits or receptacles.

It is another object of the present invention to provide a fully encased flow dividing valve having no external moving parts.

A further object of the invention is to provide a flow dividing valve operable according to a predetermined pattern to alternately deliver substantially the entire volume of a fluid stream to each of a plurality of conduits or receptacles.

Another object of the present invention is the provision of a flow dividing valve having a self-contained, adjustable, fluid operated proportionating means.

These and other objects of the invention are more fully set forth in the following detailed discussion having reference to the accompanying drawings in which an illustrative embodiment of the invention is shown.

Figure 1:
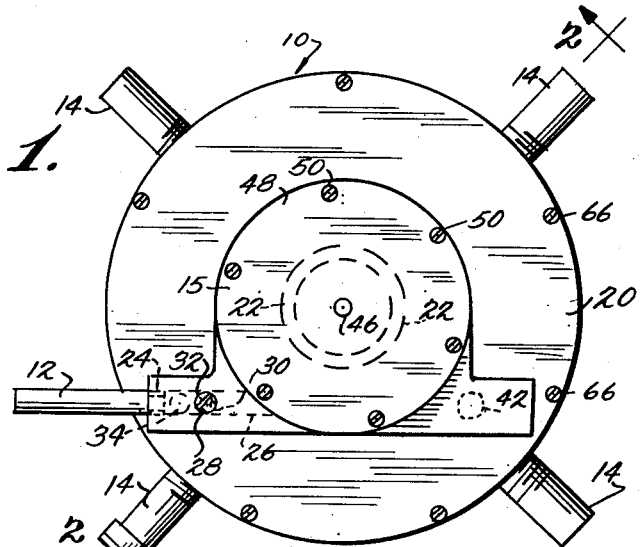
FIGURE 1 is a top plan view of the invention.
Figure 2:
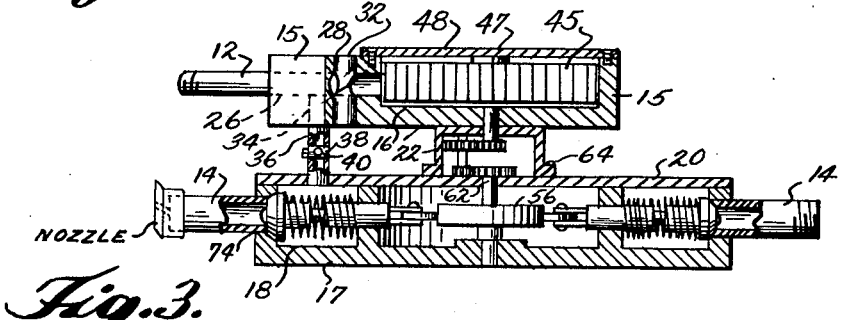
FIGURE 2 is a sectional view taken substantially along line 2—2 of FIGURE 1.

The valve of the invention as indicated generally at 10 in FIGURE 1 has a single fluid inlet conduit 12 and a plurality of fluid outlet conduits 14. As best shown in FIGURE 2, the casing of the valve 10 comprises an upper casing 15 having an impeller chamber 16 therein and a lower casing 17 having a distributor chamber 18 formed therein. The casings 15 and 17 are separated from one another by a cover plate 20 and a gear reducer assembly 22 mounted thereon.

The fluid inlet conduit 12, which is connectable to a source of fluid under pressure, is secured to the upper casing 15 as by a threaded connection 24. A conduit 26 formed in the upper casing extends between the conduit 12 and the impeller chamber 16. The conduit 26 preferably enters the chamber 16 as a tangent thereto.

A stopcock 28 having a through-bore 30 is interposed in conduit 26 and is operable between a fully open and a constricting position as by rotating the slot 32 in the stem of the stopcock 28 with a screw driver or the like.

A second conduit 34 is formed in the casing as an impeller chamber bypass and extends between the inlet conduit 12 and a fluid transfer conduit 36. The fluid transfer conduit 36 is threaded into the upper casing 15 and the lower casing cover plate 20. A stopcock 38 having a through-bore 40 is interposed in the transfer conduit 36 and is operable in a manner similar to stopcock 28 to control the volume and pressure of fluid entering the distributor chamber 18.

Spaced circumferentially from the entrance of conduit 26 on the surface of revolution of the side wall of chamber 18 in a direction away from the inlet conduit 12 is the entrance of a conduit 42 formed in the upper casing. Conduit 42 communicates with a second transfer conduit 44 which is threaded into the upper casing 15 and the lower casing cover plate 20.

Disposed within the impeller chamber 16 is an impeller 45 keyed to vertical shaft 46. The shaft 46 is journaled at the upper end thereof in a ring-like boss 47 formed on the inner surface of a cover plate 48. Removable fasteners such as screws 50 secure an upper cover plate 48 to the upper casing 15. Suitable sealing means such as a resilient gasket or waterproof sealing compound may be interposed between the cover plates 20 and 48 and their respective casings 15 and 17 to provide a fluid-tight seal.

The impeller shaft 46 extends downwardly through a suitable opening 52 in the floor of the impeller chamber 16 and engages the input 54 of the gear reducer assembly 22.

Figure 4:
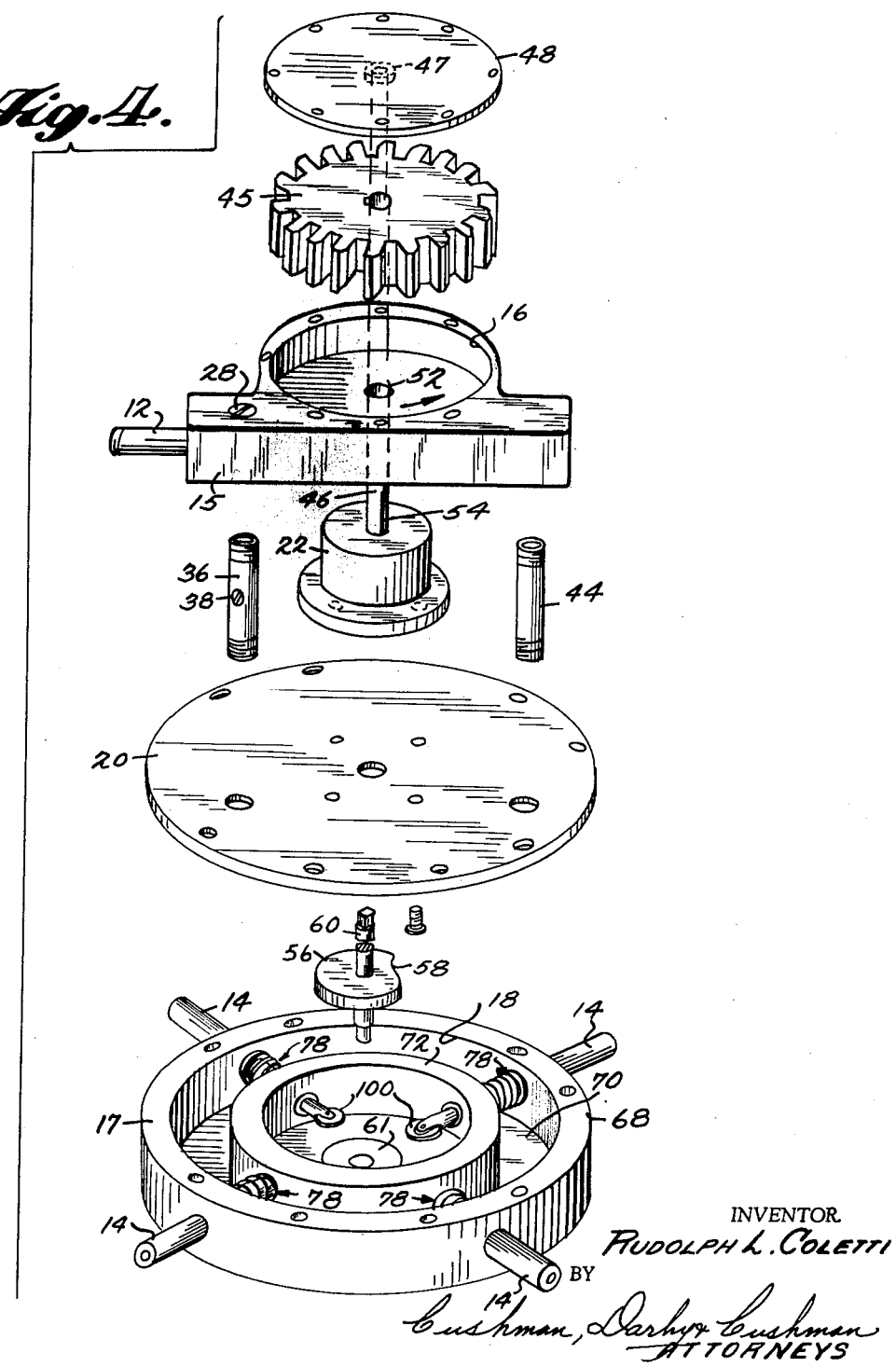
FIGURE 4 is an exploded perspective view of the invention.

A disk-like cam 56 having at least one indentation 58 formed thereon is keyed to and coaxial with a shaft 60 which passes through the cam disk. The cam shaft 60 is vertically positioned at the longitudinal axis of the lower casing 17 and journaled at the lower end thereof in a ring-like boss 61 formed on the floor of the lower casing 17. The upper end of the cam shaft 60 engages the output 62 of the gear reducer assembly 22. The gear reducer assembly is secured to the lower casing cover plate 20 as by screws 64 and the cover plate 20 in turn is secured to the lower casing as by screws 66. The cover plate 20 cooperates with the cylindrical outer wall 68 and floor 70 of the lower casing 17 to define the distributor chamber 18. As best shown in FIGURES 2 and 4, the distributor chamber is annular in shape, the inner extent thereof being defined by a cylindrical wall 72 extending between the casing floor 70 and sealing engagement with the cover plate 20. The wall 72 is preferably formed integrally with the lower casing 17. As best shown in FIGURE 4, the cam 56 is mounted for rotation within the cylindrical envelope defined by the inner wall 72, the casing floor 70 and the cover plate 20.

The outlet conduits 14 are circumferentially spaced around the outer side wall 68 of the lower casing 17 and are threaded into suitable openings 74 in the outer side wall as to be in communication with the distributor chamber 18. A plurality of openings 76 are formed through the inner wall 72, each corresponding to radially inward projections of the openings 74.

Figure 3:
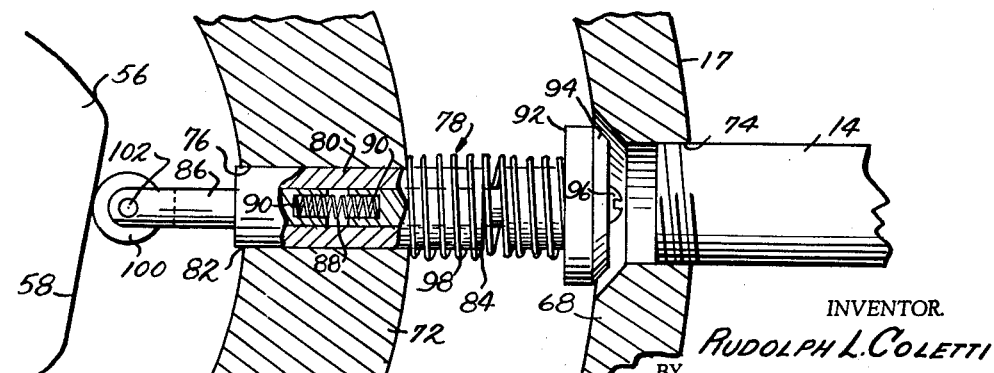
FIGURE 3 is a sectional view taken along line 3—3 of FIGURE 1.

Supported by and projecting through an inner wall opening 76 is a plunger assembly 78. As best shown in FIGURES 3 and 4, each plunger assembly 78 includes a hollow cylindrical sleeve 80 which is preferably force fit in an opening 76. As shown, the inner end 82 of the sleeve 80 is approximately flush with the inner surface of the wall 72 while the outer end 84 thereof, projects a substantial distance into the distributing chamber 18. Slidably positioned within the sleeve 80 and extending beyond each end thereof is a split connecting rod 86. A suitable resilient means, as coil spring 88, is positioned between the inner and outer portions of the rod 86 and supported by recesses 90 formed in the inner end of the outer portion of the rod 86 and the outer end of the inner portion of the rod 86. The ends of the coil spring may be secured within the recesses as by epoxy cement or the like. A plug 92 is fixedly secured to the outer end of the outer portion of each connecting rod 86 as to be coaxial with the rod and adjacent one of the openings 74 in the outer wall 68 of the lower casing 17. As shown in FIGURE 3, the plug 92 is preferably formed integrally with the outer portion of the rod 86 and has a resilient sealing pad 94 secured to the outer surface thereof as by a screw 96. The inner end of the opening 74 is preferably counterbored to mate with the sealing pad 94 as best illustrated in FIGURE 3. The diameters of the plug 92 and sealing pad are somewhat larger than the diameter of each opening 74, so that the opening is efficiently blocked when the plug and sealing pad are urged against the opening in a manner described more fully hereinafter. A coil spring 98 is positioned on each plunger assembly 78 as to circumscribe the outer portions of the connecting rod 86 and sleeve 80. The spring 98 is fixedly secured at its outer end to the rod 86 and at its inner end to the sleeve 80. The spring 98 is assembled to the plunger assembly in a stretched manner so that it is in tension when at the rest position shown in FIGURE 3 and therefore acts to bias the connecting rod 86 and plug 92 radially inward of the valve, away from the opening 74.

A roller 100 is mounted on a pin 102 for rotation about a vertical axis adjacent the inner end of the inner member of the rod 86. As best shown in FIGURES 2 and 3 the roller 100 on the connecting rod 86 of each plunger assembly engages the cam surface of the disk-like cam 56. The cam 56 is operable in a manner more fully described hereinafter to selectively urge particular connecting rods 86 radially outwardly so that the resilient faced plugs 92 block the openings 74 and allow at least one of the openings 74 to remain open at a particular time.

It should be understood that although the outlet conduits 14 are shown ending in threaded connections, that conventional spray nozzles, storage tanks, piping or the like will be connected to the conduits 14 in the use of the valve of the invention.

It should also be realized that although four plunger assemblies are illustrated in the drawings, that any number of plunger assemblies spaced at either equal or differing distances from one another around the periphery of the valve are within the contemplation of the instant invention. Although water will be used herein as an example of a fluid, the valve of the invention is equally useful in proportioning and controlling the distribution of other fluids such as chemical solutions, slurries, foams and gases.

Operation of the valve

In operation the valve of the invention is connected to suitable supply of fluid under pressure such as a conventional garden hose. Each outlet conduit 14 is connected to a fluid user such as a sprinkler nozzle. Water entering the valve through the inlet 12 is divided at the junction of conduits 26 and 34. The proportion of the water which enters each of the conduits can be adjusted by manipulation of the stopcocks 28 and 38. The portion of the water that flows through conduit 26 enters the impeller chamber 16 tangentially of the chamber. This water stream impinges on the blades of the impeller 45 causing it to rotate in the direction shown by the arrow (FIG. 4). This water stream then leaves the impeller chamber through the transfer conduit 44 and flows into the distributor chamber 18. The water which is directed from the inlet into conduit 34 flows through the transfer conduit 36 and into the distributor chamber. The speed of rotation of the impeller can be controlled by increasing and decreasing the water supply pressure or manipulating the stopcocks. It is contemplated that suitable indicia can be applied to the valve adjacent the stopcocks 28 and 38 to aid the user in selecting the desired impeller speed.

The rotation of the impeller 45 is transmitted through the shaft 46 to the gear reducer 22 which may be of a variable ratio type, although a fixed ratio type is generally adequate for most uses. The exact ratio used controls the time that each valve outlet is open. Therefore, the ratio chosen will depend on the use of the valve. For some uses of the valve it may be desirable to replace the reduction gearing with a direct drive between the impeller and the cam. The rotative motion imparted to the impeller 45 by the water is transmitted by the gear reducer 22 to the cam 56. The disk-like cam 56 is caused by the gear reducer to rotate more slowly than the impeller 45. As the cam rotates, each of the plunger rollers 100 follow the cam surface. In the embodiment of the invention shown, the cam indentation 58 extends for a distance around the periphery of the cam 56 that is slightly less than the circumferential distance between any two rollers 100. Therefore, at any instant only one of the rollers 100 is contacting the indentation 58. When a roller contacts an indentation the tension spring 98 associated therewith urges the roller 100, rod 86 and padded plug 92 radially inwardly allowing the water under pressure in the distribution chamber 18 to flow out of the valve through the opening 74 associated with the inwardly moved plunger assembly. As the cam rotates further the roller associated with the inwardly moved plunger assembly is urged outwardly by the cam causing the plug 92 to block the associated opening 74. Thereafter, each plunger assembly is allowed to move inwardly and is then urged outwardly in continuous succession around the periphery of the valve. The coil spring 88 has a greater force constant than the tensioned coil spring 98 and operates as a shock absorber during the outward movement of the rod member 86. In the manner set forth above, the entire volume of the stream of water entering the valve is successively directed through the several orifices, one at a time.

When used as a lawn sprinkler, conventional nozzles are secured to the outlets 14 and as the cam 56 rotates within the valve, water successively issues from the nozzles in spurts, each spurt coming from a nozzle spaced further around the periphery of the valve body than the preceding spurt. Because only one of the nozzles is open to the distribution chamber at a time, the exit water pressure is approximately the same as the inlet pressure, being decreased only by friction losses and the amount of work done within the valve.

The valve of the invention can be used without modification as a dividing valve for shunting fluids into a plurality of conduits or receptacles. Using the embodiment illustrated in the drawings in which each of the four outlets 14 is of the same diameter, a fluid stream directed into the valve 10 at the inlet 12 would issue from the outlets 14 divided into four equal volumes. The valve of the invention thus contains its flow dividing means and all the moving parts thereof entirely within the valve casing and the flow divider is powered by the flow of the fluid to be divided.

It is within the purview of the invention, however, that the valve may be modified to distribute unequal volumes of fluid from the various outlets as by providing orifices of different diameters, capping unneeded outlets with conventional pipe caps or varying the structure of the cam, as by providing a separate cam surface for each roller.

Although four outlets have been shown on the valve of the invention, it should be realized that a greater or lesser number could be employed and that it is not necessary to the operation of the valve for the outlets to be equally spaced from one another around the periphery of the valve.

It should also be realized that while only one outlet orifice is open to the distribution chamber at any instant, according to the preferred embodiment of the invention as shown, that it is possible to provide for the opening of a plurality of adjacent or non-adjacent outlet orifices at any instant by modifying the extent and number of the cam indentations or altering the spacing between the outlets shown.

Inasmuch as other modifications will become apparent to those skilled in the art, it is intended that the embodiments of the invention set forth above not limit the extent of the invention, but that the invention be limited only by the spirit and scope of the following claims.

I claim:
1. In a flow dividing valve of the type comprising a first fluid tight motor chamber having a fluid inlet, a second fluid tight chamber, a fluid transfer conduit connecting the chambers, a fluid operated motor located in the first chamber, outlet conduits connecting the second chamber with the exterior of the valve, valve means for controlling the outlet conduits and a cam operatively connected to the motor for the valve means, the improvement which comprises a metering bypass connecting the inlet to the second chamber whereby the pressure and amount of water entering the first chamber to drive the fluid operated motor is controlled by diverting a portion of the fluid entering said inlet directly to said second chamber.

2. A flow dividing valve as set forth in claim 1 wherein said bypass additionally comprises adjustable means disposed in said bypass for controlling the portion of fluid diverted from said inlet to said second chamber whereby the pressure and amount of water entering said first chamber to drive said fluid operated motor may be varied.

3. A flow dividing valve as set forth in claim 1 additionally comprising means disposed in said inlet conduit between the juncture of said bypass with said inlet and the opening of said inlet into said first chamber to control the volume and pressure of fluid entering said first chamber whereby the speed of rotation of said fluid motor may be controlled.

4. A flow dividing valve comprising a first fluid tight motor chamber having a fluid inlet and a fluid motor therein, a second fluid tight chamber having outlet openings therein, a fluid transfer conduit interconnecting the chambers, a cam driven by the fluid motor and positioned for rotation within said second chamber, and a plurality of plungers in said second chamber, one adjacent each outlet opening and being movable under the control of the cam, between a first position where it blocks the associated outlet opening and a second position where it is spaced from the associated outlet opening, and resilient means urging each plunger away from said associated outlet, said plungers each comprising a pair of axially aligned rods supported in a hollow sleeve, resilient means interposed within the sleeve between the adjacent ends of said rods, one opposite end of one of said rods cooperating with said cam, the other end of the other of said rods cooperating with said outlet opening, said resilient means permitting a lost motion when said rod is activated by said cam whereby said lost motion serves as a shock absorber between said cam actuated rod and the outlet opening.

5. A flow dividing valve as set forth in claim 4 wherein said resilient means interposed between the adjacent ends of said rods comprises a coiled spring to permit a lost motion when said rod is actuated by said cam wherein said lost motion serves as a shock absorber between said cam actuated rod and said outlet valve.

6. A construction in accordance with claim 4 characterized in that the first mentioned resilient means is a tension spring coiled about each plunger and urging it in an axial direction away from its associated outlet opening.

References Cited by the Examiner

UNITED STATES PATENTS

| | | | |
|---|---|---|---|
| 1,681,044 | 8/28 | Malik | 251—77 |
| 1,855,647 | 4/32 | Pottenger | 137—624.14 XR |
| 2,420,589 | 5/47 | Dunnihoo | 251—257 |
| 2,452,354 | 10/48 | Bucknell et al. | 251—85 |
| 2,642,076 | 6/53 | Tigert et al. | 137—119 |
| 2,781,050 | 2/57 | Edwards | 137—119 |

MARTIN P. SCHWADRON, *Acting Primary Examiner.*